United States Patent
Nakatsu et al.

(10) Patent No.: US 6,794,854 B2
(45) Date of Patent: Sep. 21, 2004

(54) VEHICLE POWER CONVERTED WITH SHUNT RESISTOR HAVING PLATE-SHAPE RESISTIVE MEMBER

(75) Inventors: Kinya Nakatsu, Hitachi (JP); Masataka Sasaki, Hitachi (JP); Ryuichi Saito, Hitachi (JP); Satoshi Ibori, Yachimata (JP); Masato Takase, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/290,549

(22) Filed: Nov. 7, 2002

(65) Prior Publication Data

US 2003/0090241 A1 May 15, 2003

Related U.S. Application Data

(63) Continuation of application No. 10/102,558, filed on Mar. 19, 2002.

(51) Int. Cl.$^7$ .............................. H02H 7/26; H02P 9/30; H02P 9/10; H02P 9/38
(52) U.S. Cl. ............................ 322/27; 322/38; 322/17; 338/49
(58) Field of Search .............................. 322/38, 27, 17; 338/334, 49

(56) References Cited

U.S. PATENT DOCUMENTS

| | | | |
|---|---|---|---|
| 906,498 A | 12/1908 | Weston | 338/49 |
| 1,601,840 A | 10/1926 | Angus | 338/49 |
| 3,245,021 A | 4/1966 | Kernander et al. | 338/49 |
| 3,849,757 A | 11/1974 | Khammous et al. | 338/320 |
| 4,074,150 A * | 2/1978 | Buckley et al. | 327/87 |
| 4,187,436 A * | 2/1980 | Etienne | 290/27 |
| 4,384,287 A * | 5/1983 | Sakuma | 345/60 |
| 4,396,900 A | 8/1983 | Hall | 338/309 |
| 4,494,068 A | 1/1985 | Ley et al. | 324/126 |
| 5,111,179 A | 5/1992 | Flassayer et al. | 338/313 |
| 5,119,671 A * | 6/1992 | Kopera | 73/116 |
| 5,122,690 A * | 6/1992 | Bianchi | 326/87 |
| 5,150,683 A * | 9/1992 | Depa et al. | 123/406.45 |
| 5,214,407 A | 5/1993 | McKim, Jr. et al. | 338/49 |
| 5,274,350 A | 12/1993 | Larson | 338/49 |
| 5,301,098 A * | 4/1994 | Dhyanchand et al. | 363/97 |
| 5,473,228 A * | 12/1995 | Nii | 318/158 |
| 5,497,070 A * | 3/1996 | Furutani et al. | 322/23 |
| 5,589,743 A * | 12/1996 | King | 318/139 |

(List continued on next page.)

Primary Examiner—Nicholas Ponomarenko
Assistant Examiner—Pedro J. Cuevas
(74) Attorney, Agent, or Firm—Hogan & Hartson, LLP

(57) ABSTRACT

A power converter includes a shunt resistor constituted by a shunt resistance and a plurality of main electrodes made of a sheet-like resistive material. In the shunt resistor, plates lower in volume electric resistivity than the resistive material, higher in thermal conductivity than the resistive material and thicker in thickness than the resistive material are fixedly attached by solder, to the side surfaces of the main electrodes opposite to the side surfaces with which the main electrodes are fixedly attached to an insulating layer. At least one plate main electrode for electrically connecting with main circuit wiring is provided in each of the plates. At least one constricted portion is formed between each of the plate main electrodes and the shunt resistance. Plate detection electrodes for detecting a voltage between the opposite ends of the shunt resistance is provided on the plates near the shunt resistance portion.

9 Claims, 9 Drawing Sheets

U.S. PATENT DOCUMENTS

| | | | | |
|---|---|---|---|---|
| 5,819,187 A | * | 10/1998 | Sato et al. | 701/1 |
| 5,821,962 A | * | 10/1998 | Kudo et al. | 347/65 |
| 5,953,811 A | | 9/1999 | Mazzochette | 29/612 |
| 5,999,085 A | | 12/1999 | Szwarc et al. | 338/309 |
| 6,007,187 A | * | 12/1999 | Kashino et al. | 347/65 |
| 6,028,022 A | * | 2/2000 | Ohashi | 501/152 |
| 6,062,680 A | * | 5/2000 | Yoshihira et al. | 347/65 |
| 6,070,970 A | * | 6/2000 | Ogasawara et al. | 347/65 |
| 6,095,639 A | * | 8/2000 | Uetsuki et al. | 347/65 |
| 6,102,529 A | * | 8/2000 | Okazaki et al. | 347/65 |
| 6,106,111 A | * | 8/2000 | Taneya et al. | 347/86 |
| 6,109,735 A | * | 8/2000 | Kashino et al. | 347/65 |
| 6,113,224 A | * | 9/2000 | Sugama et al. | 347/65 |
| 6,151,049 A | * | 11/2000 | Karita et al. | 347/65 |
| 6,154,237 A | * | 11/2000 | Kashino et al. | 347/48 |
| 6,164,736 A | * | 12/2000 | Warner | 305/136 |
| 6,168,264 B1 | * | 1/2001 | Yoshihira et al. | 347/65 |
| 6,183,068 B1 | * | 2/2001 | Kashino et al. | 347/65 |
| 6,206,508 B1 | * | 3/2001 | Asakawa et al. | 3417/65 |
| 6,213,592 B1 | * | 4/2001 | Takenouchi et al. | 347/65 |
| 6,252,616 B1 | * | 6/2001 | Okazaki et al. | 347/65 |
| 6,270,199 B1 | * | 8/2001 | Kimura et al. | 347/65 |
| 6,292,091 B1 | | 9/2001 | Kambara et al. | 338/195 |
| 6,302,518 B1 | * | 10/2001 | Kudo et al. | 347/42 |
| 6,305,789 B1 | * | 10/2001 | Nakata et al. | 347/61 |
| 6,312,111 B1 | * | 11/2001 | Kimura et al. | 347/65 |
| 6,318,848 B1 | * | 11/2001 | Iwasaki et al. | 347/65 |
| 6,331,050 B1 | * | 12/2001 | Nakata et al. | 347/65 |
| 6,334,669 B1 | * | 1/2002 | Kudo et al. | 347/65 |
| 6,429,613 B2 | * | 8/2002 | Yanase et al. | 318/139 |
| 6,447,626 B1 | * | 9/2002 | Ohashi | 156/89.27 |
| 6,554,383 B2 | * | 4/2003 | Nagatomo et al. | 347/9 |

* cited by examiner

VEHICLE POWER CONVERTED WITH SHUNT RESISTOR HAVING PLATE-SHAPE RESISTIVE MEMBER

This is a continuation of application Ser. No. 10/102,558 filed Mar. 19, 2002, which application is hereby incorporated by reference in its entirety.

BACKGROUND OF THE INVENTION

The present invention relates to a power converter such as an inverter or a power storage, and particularly relates to a power converter of a pulse width modulation control system with an electric current detector using a shunt resistor.

Inverters have been used widely for operating AC motors such as induction motors, and recently used also as controllers for power sources of carriages. Thus, the advantage of adjustable speed operation by using the inverters may be enjoyed sufficiently.

For the control of an inverter, detection of a load current may be required. A hall element type current sensor 28 or a shunt resistor 13 with a detection circuit 18 has been conventionally adopted for the detection of the load current.

The hall element type current sensor 28 is a current sensor in which a hall element is provided in a part of an annular magnetic substance, and an electric wire supplied with a load current is wound around or passed through the magnetic substance so that magnetic flux generated by the load current is converted into a voltage by the hall element. In this case, there is a merit that a detection signal electrically isolated from an electric circuit which is a target to be detected can be obtained.

Similarly, the shunt resistor 13 and the detection circuit 18 are defined as follows. That is, a resistor inserted in series into an electric circuit in which a load current flows is a shunt resistor. A voltage drop appearing between the opposite terminals of the shunt resistor 13 due to the load current. In order to form a detection signal from the voltage drop, a circuit is used as the detection circuit 18. The shunt resistor 13 with the detection circuit 18 can be provided with considerably low cost. Thus, such circuits have been conventionally used widely.

FIG. 11 shows an example of the background art in which both the hall element type current sensor 28 and the shunt resistor 13 with the detection circuit 18 have been applied to a power converter of a PWM (Pulse Width Modulation) control system as a target. Here, both the hall element type current sensor 28 and the shunt resistor 13 with the detection circuit 18 are illustrated for the sake of description. Actually, it will go well if either the hall element type current sensor 28 or the shunt resistor 13 with the detection circuit 18 is provided.

In FIG. 11, a main circuit is constituted by a converter (power rectification portion) 14, an inverter (power inversion portion) 15 of a PWM control system, and a smoothing capacitor 16. The converter 14 is constituted by a diode rectifier. DC power outputted from the converter 14 is supplied to the inverter 15. The capacitor 16 is connected to a DC circuit between the converter 14 and the inverter 15.

Then, when AC power is supplied to the converter 14 from a commercial power source 29 as a power source, DC power smoothed by the capacitor 16 is supplied to the inverter 15. Here, semiconductor switching devices 5 represented by IGBTs (Insulated Gate Bipolar Transistors) in the inverter 15 are PWM-controlled so that the DC power is converted into AC power with a specific voltage and a specific frequency. As a result, power with a variable voltage and a variable frequency is supplied to a load such as an induction motor.

As shown in FIG. 12, also in a power converter in which DC power outputted by a power storage 30 such as a battery is supplied to the inverter 15, semiconductor switching devices 5 of the inverter 15 are PWM-controlled in the aforementioned manner so that DC power is converted into AC power with a specific voltage and a specific frequency. As a result, power with a variable voltage and a variable frequency is supplied to a motor 17 as a load, such as a power source for a carriage, a cooling fan of a cooler, a pump driving motor for circulating cooling water, a hydraulic pump driving motor for hydraulic apparatus, or a compressor driving motor for an air conditioner.

At this time, on (conduction) and off (interruption) of the semiconductor switching devices 5 in the inverter 15 are controlled in accordance with PWM signals by a computer 19 through a driver circuit as shown in FIG. 11. To this end, the value of a current flowing in the motor 17 which is a load, that is, the value of a load current is required for the control by the computer 19.

To detect the value of the load current, there are two methods as described previously. That is, one is a method using the hall element type current sensor 28 and the other is a method using the shunt resistor 13 and the detection circuit 18.

First, when the hall element type current sensor 28 is used, this current sensor is connected in series between the inverter 15 and the motor 17 which is a load. The detection result by the current sensor 28 is A/D converted and supplied to the computer 19.

On the other hand, when the shunt resistor 13 and the detection circuit 18 are used, the shunt resistor 13 is connected in series between the capacitor 16 and the inverter 15. A voltage drop appearing due to a load current flowing in the shunt resistor 13 is A/D converted through a filter, an amplifier and so on, and supplied to the computer 19. The shunt resistor 13 may be connected in series between the inverter 15 and the motor 17.

The shunt resistor 13 is, generally, of a sheet-like resistive material 6 made of manganin material (alloy of copper and manganese) excellent in temperature characteristics. The sheet-like resistive material 6 is formed into a predetermined shape by punching or by etching after fixed attachment to an insulating layer 4. A shunt resistance 8, main electrodes 7 for making a load current flow into the shunt resistance 8, and detection electrodes 31 for detecting a voltage generated in the shunt resistance 8 are formed from the same resistive material. As shown in FIGS. 13A and 13B, the shunt resistance 8, the main electrodes 7 and the detection electrodes 31 are mounted on a heat radiating base plate 1 of a power module through the insulating layer 4. The heat radiating base plate 1 is superior in heat radiation characteristics, and the semiconductor switching device 5 of the inverter 15 is mounted on the base plate 1.

Heat generation in the shunt resistor 13 occurs in both the shunt resistance 8 and the main electrodes 7 because the load current flows into the shunt resistance 8 and the main electrodes 7. The generated heat flows into the heat radiating base plate 1 so that the temperature increase is suppressed.

The length, width and thickness of the shunt resistor 13 using the sheet-like resistive material 6 are defined as follows. That is, the length direction of the shunt resistor 13 is defined as the direction in which a detection current flows. The width direction of the shunt resistor 13 is defined as the direction perpendicular to the length direction. The thickness direction of the shunt resistor 13 is defined as the direction perpendicular to the insulating layer 4.

SUMMARY OF THE INVENTION

In the background art, the hall element type current sensor 28 or the shunt resistor 13 with the detection circuit 18 is used for PWM control of a power converter. However, in the case of the hall element type current sensor 28, a comparatively expensive hall element and a large magnetic substance are required. Accordingly, there is a problem in cost reduction and miniaturization.

On the other hand, the shunt resistor 13 and the detection circuit 18 can be constituted by small and inexpensive electronic parts. However, the shunt resistor 13 and the detection circuit 18 are connected in series with a power line so as to detect a load current ranging from several amperes to several thousands of amperes. Thus, heat is generated. Although manganin material or the like having a low rate of resistance temperature change is used to improve the accuracy, the resistivity of the manganin material is several tens of times as high as that of copper material. Thus, the resistance value is required to be made a minimum (about 0.5–0.6 mΩ) in order to suppress heat generation. When the sheet-like resistive material 6 is made thick and short, the bottom area of the resistive material is reduced. As a result, the heat radiation resistance increases to cause temperature increase. Further, heat is generated also in the shunt resistance 8 and the main electrodes 7 for making the load current flow into the shunt resistance 8. Thus, the amount of heat generated in the shunt resistor as a whole is increased. Indeed such increase of the amount of heat generated in the shunt resistor as a whole can be avoided by increasing the size of the main electrodes 7 to thereby increase the heat radiation area and reduce the thermal resistance. But the shunt resistor 13 and the detection circuit 18 cannot be made small in size and low in cost. Thus, it is difficult to apply the shunt resistor 13 and the detection circuit 18 to a high-capacity power converter. Further, the load current does not flow into the shunt resistor 13 uniformly by electromagnetic induction caused by the layout of power wiring to the shunt resistor 13. Thus, there arises a problem that heat generation is concentrated or the detection accuracy deteriorates.

An object of the invention is to provide a power converter excellent in control characteristics, small in size and low in cost, by use of an accurate and compact shunt resistor whose thermal resistance is reduced so that the system for detecting a load current by the shunt resistor and a detection circuit can be applied to a high-capacity power converter, while the load current distribution in the shunt resistor is made uniform.

The foregoing object is attained by a power converter in which a load current is detected from the shunt resistor 13 constituted by three parts, that is, the shunt resistance 8 and two main electrodes 7. In the power converter, the shunt resistance 8 and the main electrodes 7 are formed out of one and the same sheet-like resistive plate 6. One side of the shunt resistor 13 is fixedly attached to the insulating layer 4. Sheet-like plates 9 are fixedly attached to side surfaces of the main electrodes 7 opposite to the side surfaces with which the main electrodes 7 are fixedly attached to the insulating layer 4. Each of the plates 9 is lower in volume electric resistivity than at least the sheet-like resistive plate 6 and thicker in thickness than the sheet-like resistive plate 6. Plate main electrodes 11 are provided on the plates 9, while plate detection electrodes 12 are provided on the plates 9 for detecting a voltage generated in the shunt resistance 8 and electrically connecting the detected voltage to another wiring. Accordingly, heat generated in the two main electrodes 7 formed out of the same sheet-like resistive plate 6 as the shunt resistance 8 can be reduced on a large scale. Further, since the detection electrodes are provided on the plates 9 having low volume electric resistivity, the power converter can be made smaller in size and higher in accuracy.

The foregoing object is attained by a power converter in which a load current is detected from the shunt resistor 13 constituted by three parts, that is, the shunt resistance 8 and two main electrodes 7. In the power converter, the shunt resistance 8 and the main electrodes 7 are formed out of one and the same sheet-like resistive plate 6. One side of the shunt resistor 13 is fixedly attached to the insulating layer 4. Sheet-like plates 9 are fixedly attached to the other surfaces of the main electrodes 7 respectively. Each of the plates 9 is lower in volume electric resistivity and higher in thermal conductivity than at least the sheet-like resistive plate 6 and thicker in thickness than the sheet-like resistive plate 6. Plate main electrodes 11 are provided on the plates 9, while plate detection electrodes 12 are provided on the plates 9 for detecting a voltage generated in the shunt resistance 8 and electrically connecting the detected voltage to another wiring. Accordingly, heat generated in the shunt resistance 8 can be thermally transmitted and thermally diffused by use of the plates 9. Thus, the thermal resistance of the shunt resistor 13 can be reduced.

The foregoing object is attained by a power converter in which a load current is detected from the shunt resistor 13 constituted by three parts, that is, the shunt resistance 8 and two main electrodes 7. In the power converter, the shunt resistance 8 and the main electrodes 7 are formed out of one and the same sheet-like resistive plate 6. One side of the shunt resistor 13 is fixedly attached to the insulating layer 4. Sheet-like plates 9 are fixedly attached to the other surfaces of the main electrodes 7 respectively. Each of the plates 9 is lower in volume electric resistivity and higher in thermal conductivity than at least the sheet-like resistive plate 6 and thicker in thickness than the sheet-like resistive plate 6. Plate main electrodes 11 are provided on the plates 9, while at least one constricted portion 23 for narrowing a current flow path is provided between each of said main electrodes 11 for the plate main electrodes 11 and the shunt resistance 8 so as to be located in the plates 9 and the main electrodes 7. Accordingly, the flow path of a load current in the respective plates 9 and the respective main electrodes 7 can be controlled. Thus, the current density of the load current flowing into the shunt resistance 8 can be made uniform.

Other objects, features and advantages of the invention will become apparent from the following description of the embodiments of the invention taken in conjunction with the accompanying drawings.

DESCRIPTION OF THE EMBODIMENTS

Figures 1A, 1B:
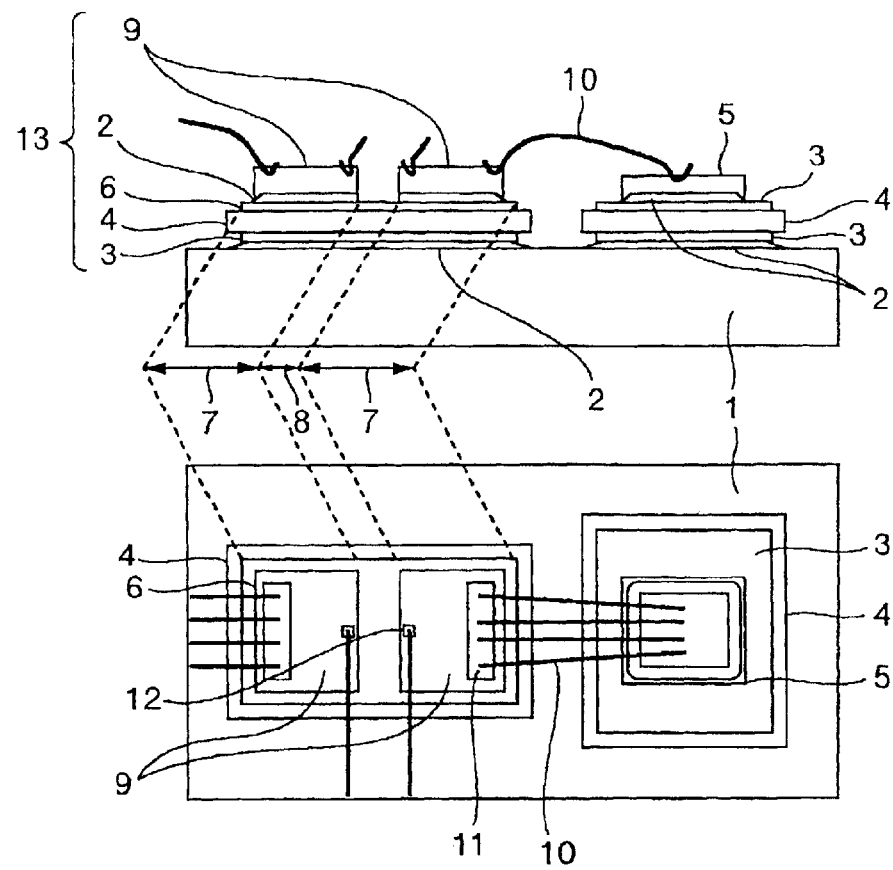
FIGS. 1A and 1B are configuration views showing a shunt resistor according to a first embodiment of the invention.

A power converter according to the present invention will be described below in detail along the embodiments illustrated in the drawings.

Figure 2:
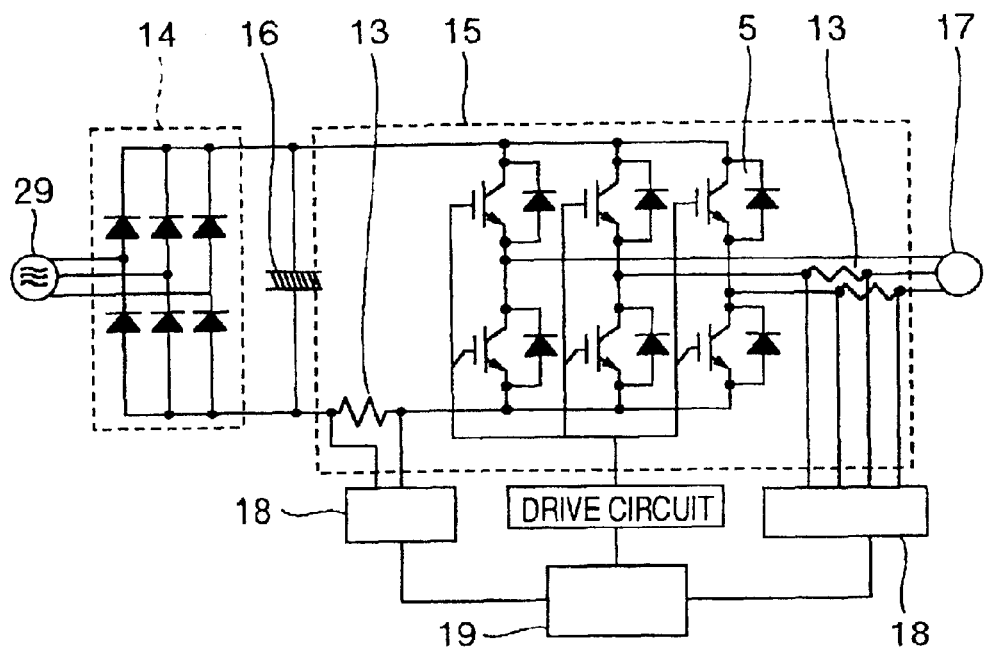
FIG. 2 is a configuration diagram for explaining a power converter using the shunt resistor according to the first embodiment of the invention.
Figure 11:
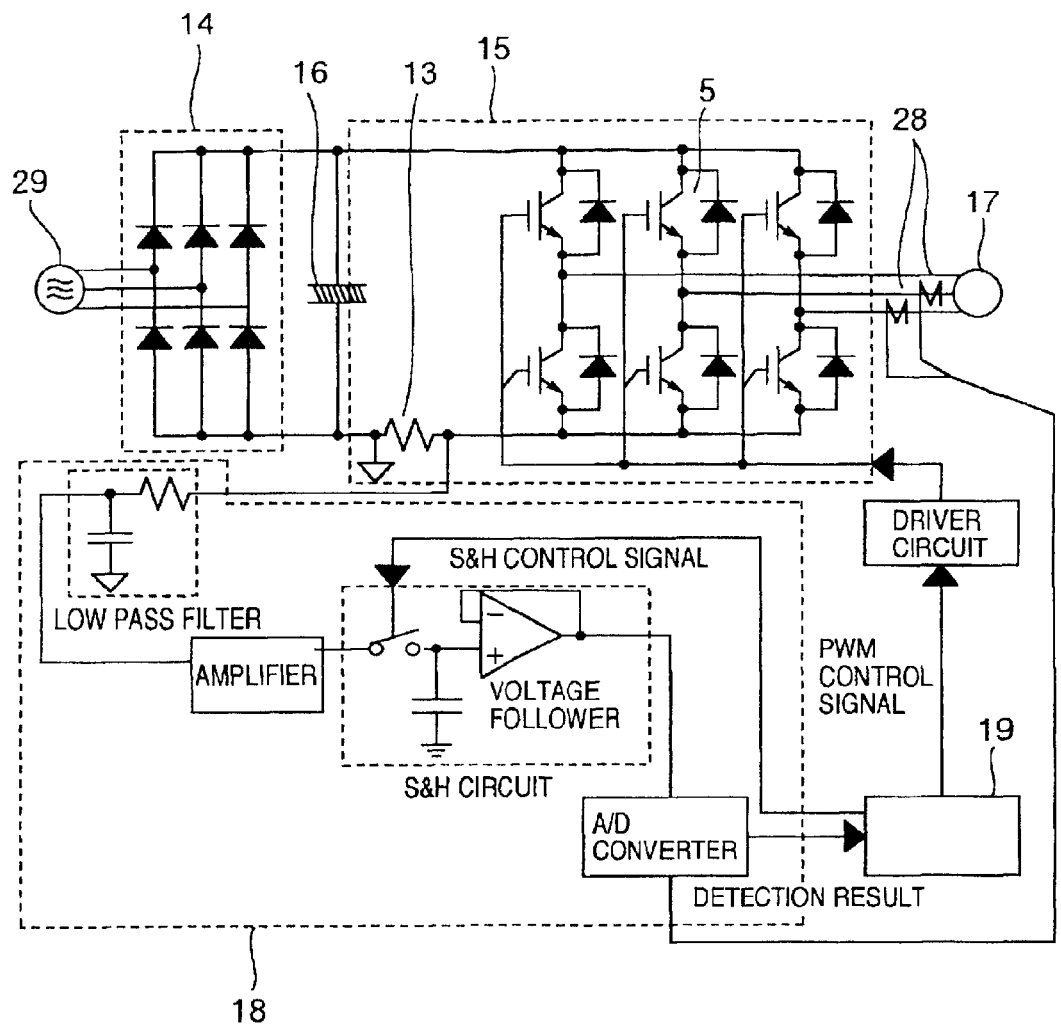
FIG. 11 is a configuration view showing a shunt resistor and a power converter using the shunt resistor according to the background art.
Figure 12:
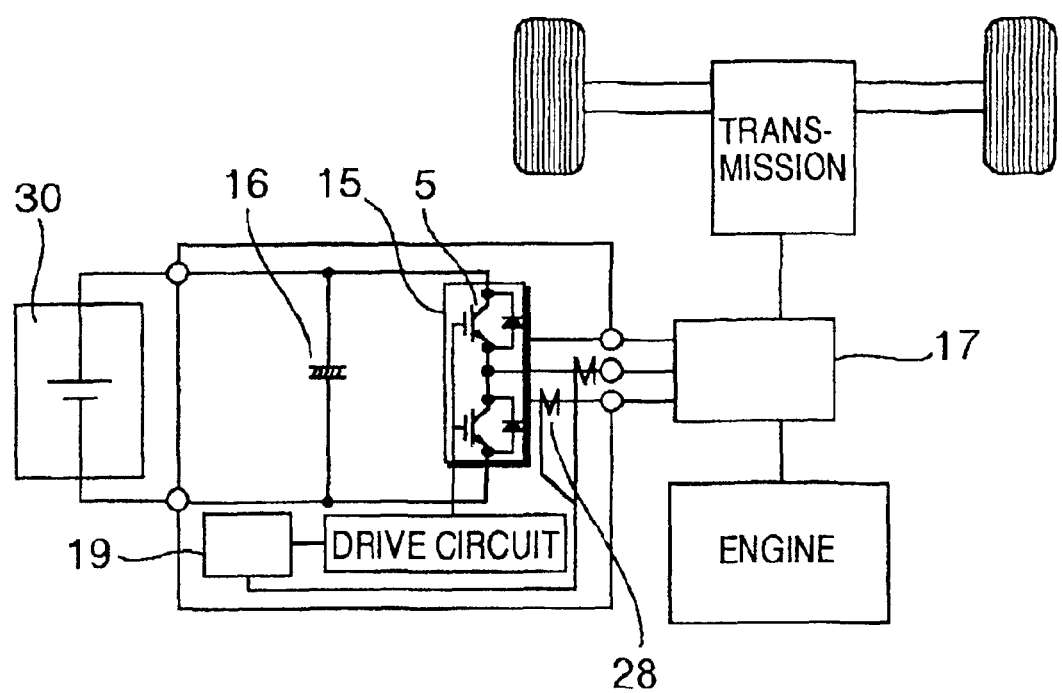
FIG. 12 is a configuration view showing a shunt resistor and a power converter using the shunt resistor according to the background art.

FIGS. 1A and 1B show an example of a shunt resistor 13 according to a first embodiment of the invention. FIG. 2 shows an example of the configuration of a power converter using the shunt resistor 13 according to the first embodiment. A power converter is generally configured to have a main circuit constituted by a converter 14, an inverter 15 of a PWM control system, and a smoothing capacitor 16, as also shown in FIG. 11. The converter 14 is constituted by a diode rectifier. DC power outputted from the converter 14 is supplied to the inverter 15. The capacitor 16 is connected to a DC portion between the converter 14 and the inverter 15.

The shunt resistor 13 is generally inserted into wiring for supplying power from the inverter 15 to an AC motor 17 as a load or inserted into wiring for electrically connecting the capacitor 16 and the inverter 15. A voltage depending on a load current and the resistance value of the shunt resistor 13 is transmitted to a computer 19 through a detection circuit 18. On the basis of predetermined calculation in the computer 19, semiconductor switching devices 5 are ON/OFF controlled so that the load current is controlled to have a specific value.

A power converter in which DC power outputted by a power storage 30 such as a battery is supplied to an inverter 15 can be also arranged by connecting the power storage 30 such as a battery similarly to the inverter 15 instead of the converter 14.

Figures 13A, 13B:
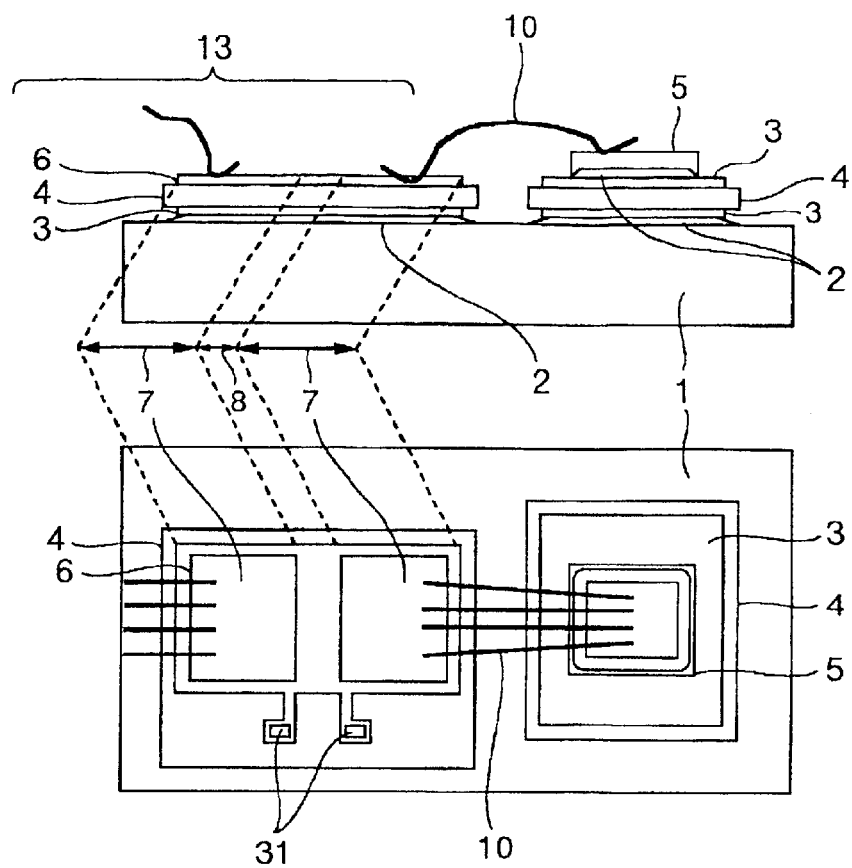
FIGS. 13A and 13B are configuration views showing a shunt resistor according to the background art.

The shunt resistor 13 is disposed in a power module on which the semiconductor switching devices 5 as constituent parts of the inverter 15 are mounted. As shown in FIG. 13, a sheet-like resistive material 6 is fixedly attached to one side of an insulating layer 4. A shunt resistance 8, main electrodes 7 for making a load current flow into the shunt resistance 8, and further detection electrodes 31 for extracting a voltage generated in the shunt resistance 8 are formed out of the sheet-like resistive material 6. Thus, the shunt resistor 13 is formed. Metal foil 3 is further fixedly attached to the side of the insulating layer 4 opposite to the side of the insulating layer 4 to which the sheet-like resistive material 6 is fixedly attached. The metal foil 3 is fixedly attached onto a heat radiating base 1 of the module by solder 2. Thus, the shunt resistor 13 is mounted on the heat radiating base 1. The main electrodes 7 provided in the shunt resistor 13 are plated, and wiring such as aluminum wires 10 is fixedly attached to the main electrodes 7. Thus, the main electrodes 7 are electrically connected to wiring constituting a main circuit of the inverter. Manganin material (alloy of copper and manganese), nichrome material, ethaverine material or the like, having a small temperature coefficient of resistance, is used as the sheet-like resistive material 6 used for the shunt resistor 13 in the same manner as in the background art shown in FIG. 13.

Accordingly, the embodiment shown in FIGS. 1A, 1B and 2 is different from the background art of FIGS. 11, 12, 13A and 13B in the following point. That is, in the shunt resistor 13 constituted by the shunt resistance 8 and the plurality of main electrodes 7 formed out of the sheet-like resistive material 6, plates 9 are fixedly attached by solder 2, to the side surfaces of the main electrodes 7 opposite to the side surfaces with which the main electrodes 7 are fixedly attached to the insulating layer 4. Each of the plates 9 is lower in volume electric resistivity than at least the sheet-like resistive material 6, higher in thermal conductivity than at least the sheet-like resistive material 6, and thicker in thickness than at least the sheet-like resistive material 6. At least one plate main electrode 11 for electrically connecting with main circuit wiring is provided on each of the plates 9, while plate detection electrodes 12 for detecting a voltage generated in the shunt resistance 8 are provided on the plates 9 near the shunt resistance 8. Here, the plate thickness is thinned at places where a current is concentrated, while the plate thickness is thickened at places where a current does not flow. Thus, the current density in the plates 9 is made so uniform that the current distribution can be optimized.

Thus, most of the load current supplied to the shunt resistor 13 flows into the plates 9 having low volume electric resistivity so that the load current passing through the main electrodes 7 made of the sheet-like resistive material 6 is reduced on a large scale. For example, assume that manganin 0.1 cm thick and 1 cm wide is used as the sheet-like resistive material 6, pure copper 0.2 cm thick and 1 cm wide is used as the plates 9, general volume electric resistivity of manganin is 43 $\mu\Omega$cm, and that of pure copper is 1.7 $\mu\Omega$cm. In this case, the load current can branch to flow into the plates 9 and the main electrodes 7 with the ratio of about 50:1.

Accordingly, heat generation in the main electrodes 7 can be reduced on a large scale. Thus, the ambient temperature of the shunt resistance 8 is reduced so that the temperature increase can be suppressed and the allowable current to be detected can be extended easily. In addition, the radiator can be miniaturized so that a compact power converter can be provided. Thus, the conversion efficiency of the power converter is improved. Further, since the plate detection electrodes 12 are formed on the low-resistive plates 9, the voltage of the shunt resistance 8 can be detected with high accuracy regardless of the shapes of the detection electrodes 31. Thus, a high performance power converter can be provided.

Figure 3:
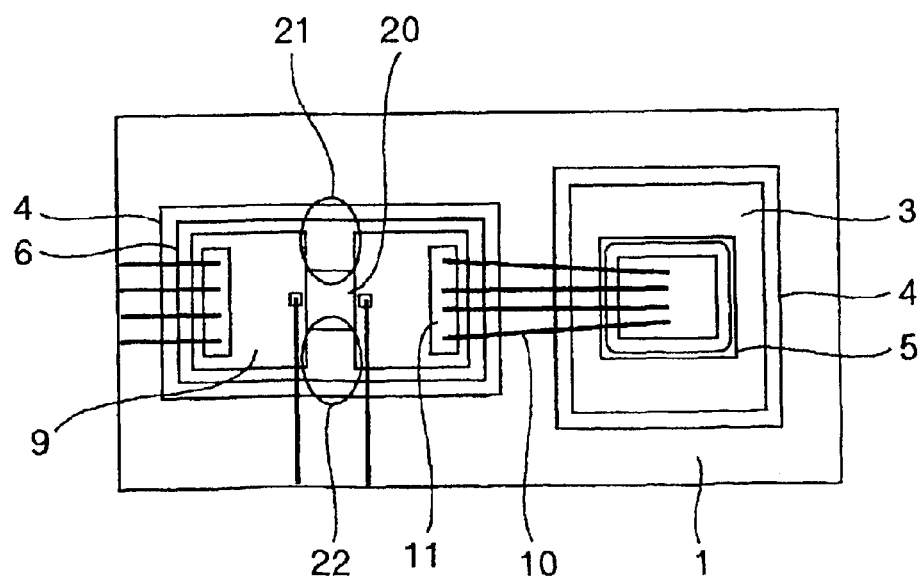
FIG. 3 is a configuration view showing a shunt resistor according to a second embodiment of the invention.

FIG. 3 shows an example of a shunt resistor according to a second embodiment of the invention. This embodiment is different from the embodiment described in FIG. 1 in the following point. That is, at least one branch port 20 for branching a load current is provided in the shunt resistance 8 in FIG. 1, and a plurality of shunt resistances 8 (first and second shunt resistances 21 and 22 in FIG. 3) separated by the branch portion 20 are connected in parallel through the plates 9.

Thus, the distribution of the load current is made uniform by the plates 9 and the load current is branched equally to the respective shunt resistances 8 so that heat generation in the respective shunt resistances 8 is made uniform. In addition, the first and second shunt resistances 21 and 22 are spaced so that heat generated in the respective shunt resistances is made easy to extend transversely. Thus, heat resistance can be reduced so that the temperature increase in the first and second shunt resistances 21 and 22 can be reduced. As a result, the maximum allowable load current value depending on the temperatures of the first and second shunt resistances 21 and 22 can be increased so that the power converter can be miniaturized.

Figure 4:
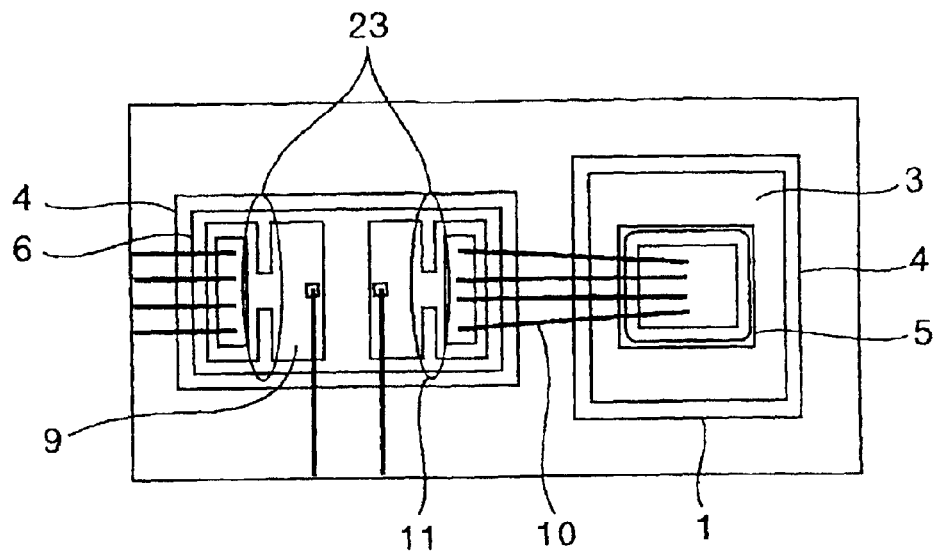
FIG. 4 is a configuration view showing a shunt resistor according to a third embodiment of the invention.

FIG. 4 shows an example of a shunt resistor according to a third embodiment of the invention. This embodiment is different from the embodiment described in FIG. 1 in the following point. That is, at least one constricted portion 23 is provided between each of the plate main electrodes 11 provided on the plates 9 and the shunt resistance 8 in FIG. 1.

Unevenness of an electric current in the wiring pattern in the power module or in a terminal block and aluminum wire wiring appears due to electromagnetic induction caused by mutual inductance among main circuit wiring of the power converter, the wiring pattern in the power module, the terminal block and the aluminum wire wiring, and the shunt resistor. Unevenness of an electric current also appears in the wiring and the shunt resistor in the layout where the wiring is bent sharply near the shunt resistor. However, when the constricted portion 23 is provided on the plate main electrode 11 between the plate main electrode 11 and the shunt resistance 8, the load current supplied from the plate main electrode 11 once flows into the constricted portion 23 in a concentrated manner. Then, the load current passing through the constricted portion 23 is diffused on the plate 9 having low volume electric resistivity. Thus, the current distribution becomes uniform immediately before the shunt resistance 8 so that a uniform load current can be made to flow into the shunt resistance 8.

Here, the distribution of the current flowing into the shunt resistance 8 can be optimized by adjusting the distance between the constricted portion 23 and the shunt resistance 8, the distance between the center of the constricted portion 23 and the longitudinal center of the shunt resistance 8, and the width and length of the constricted portion 23.

Accordingly, lopsided heat generation can be prevented in the shunt resistance 8 so that local temperature increase can be avoided, and the maximum load current value depending on the temperature increase of the shunt resistance 8 can be increased without changing the size of the shunt resistor 13. Thus, the power converter can be arranged by use of the compact shunt resistor 13 so that the power converter can be miniaturized. Further, since local temperature increase can be improved, the error of a shunt resistance value can be reduced so that the voltage of the shunt resistance 8 can be detected with high accuracy. Thus, a high performance power converter can be provided.

Similar effect can be obtained when constrictions similar to the constricted portions 23 provided in the plates 9 are provided in the main electrodes 7.

Figure 5:
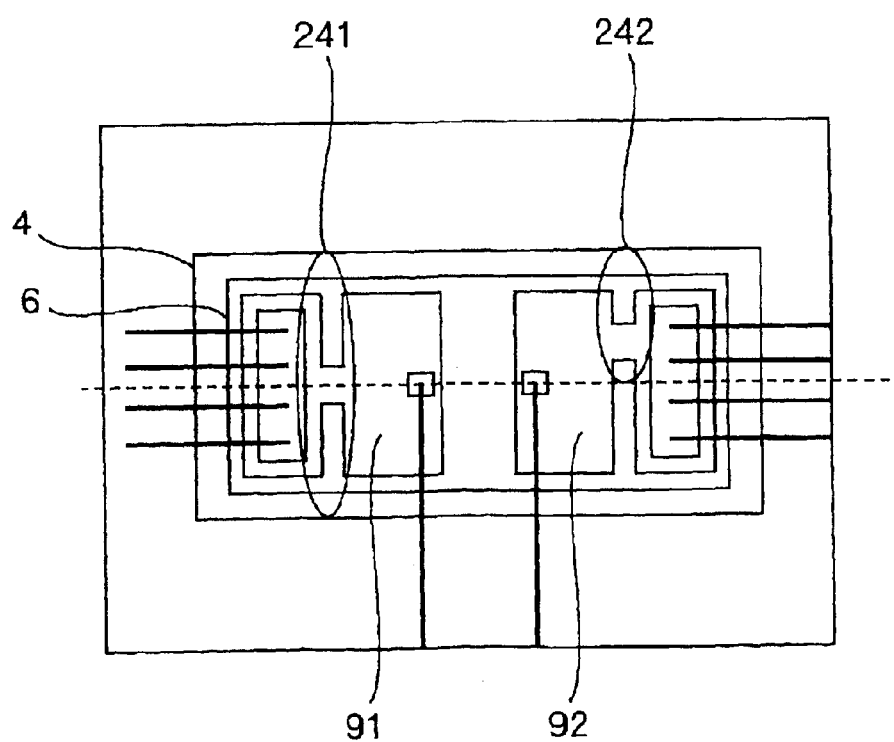
FIG. 5 is a configuration view showing a shunt resistor according to a fourth embodiment of the invention.

FIG. 5 shows an example of a shunt resistor according to a fourth embodiment of the invention. This embodiment is different from the embodiment described in FIG. 4 in the following point. That is, at least one of the center positions of the constricted portions 23 provided in the plates 9 in FIG. 4 is shifted from the same straight line.

Thus, unevenness of an electric current appearing in respective wires due to electromagnetic induction caused by mutual inductance among the wiring in the power module and the shunt resistor, or unevenness of an electric current appearing in the wiring and the shunt resistor in the layout where the connection wiring is bent sharply near the shunt resistor is rectified by use of the respective constricted portions provided in the respective plates 9. In this case, for example, the center of a first constricted portion 241 prepared in a first plate 91 is disposed on the longitudinal center line of the shunt resistance 8 while a second constricted portion 242 prepared in a second plate 92 prepared on the opposite side of the shunt resistance 8 is disposed at a distance from the longitudinal center line. In such a manner, the current density of the shunt resistance 8 is made uniform. Thus, a current flowing lopsidedly is rectified to be uniform so that a load current with current density made uniform can be supplied to the shunt resistance 8. Accordingly, lopsided heat generation can be prevented in the shunt resistance 8 so that temperature unevenness in the shunt resistance 8 can be reduced, and hence local temperature increase can be reduced. Thus, the maximum allowable load current value can be increased so that the power converter can be miniaturized by the compact shunt resistor 13. Further, the error of a shunt resistance value can be reduced so that the voltage of the shunt resistance 8 can be detected with high accuracy. Thus, a high performance power converter can be provided.

Similar effect can be obtained when constrictions similar to the constricted portions 23 provided in the plates 9 are provided in the main electrodes 7.

Figure 6:
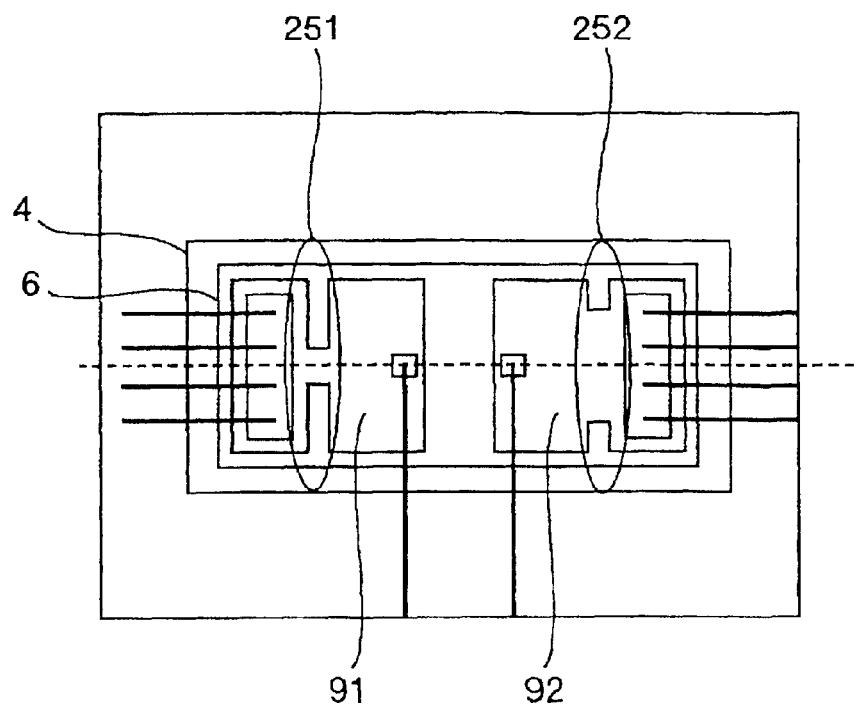
FIG. 6 is a configuration view showing a shunt resistor according to a fifth embodiment of the invention.

FIG. 6 shows an example of a shunt resistor according to a fifth embodiment of the invention. This embodiment is different from the embodiment described in FIG. 4 in the following point. That is, the width of at least one of the constricted portions 23 provided in the plates 9 in FIG. 4 is made different.

Thus, unevenness of an electric current appearing in respective wires due to electromagnetic induction caused by mutual inductance among the wiring in the power module and the shunt resistor, or unevenness of an electric current appearing in the wiring and the shunt resistor in the layout where the connection wiring is bent sharply near the shunt resistor is rectified by use of the respective constricted portions provided in the respective plates 9. In this case, for example, the width of a first constricted portion 251 prepared in a first plate 91 is made a quarter of the width of the shunt resistance 8 and the center of the first constricted portion 251 is disposed on the longitudinal center line of the shunt resistance 8. On the other hand, the width of a second constricted portion 252 prepared in a second plate 92 prepared on the opposite side of the shunt resistance 8 is made two thirds of the width of the shunt resistance 8 and the center of the second constricted portion 252 is disposed on the longitudinal center line of the shunt resistance 8 or at a distance from the longitudinal center line. In such a manner, the current density of the shunt resistance 8 is made uniform. Thus, a current flowing lopsidedly is rectified to be uniform so that a load current with current density made uniform can be made to flow into the shunt resistance 8. Accordingly, lopsided heat generation can be prevented in the shunt resistance 8 so that temperature unevenness can be reduced without changing the size of the shunt resistor 13, and hence local temperature increase can be reduced. Thus, the maximum allowable load current value can be increased so that the power converter can be miniaturized by the compact shunt resistor 13. Further, the error of a shunt resistance value can be reduced so that the voltage of the shunt resistance 8 can be detected with high accuracy. Thus, a high performance power converter can be provided.

Similar effect can be obtained when constrictions similar to the constricted portions 23 provided in the plates 9 are provided in the main electrodes 7.

Figure 7:
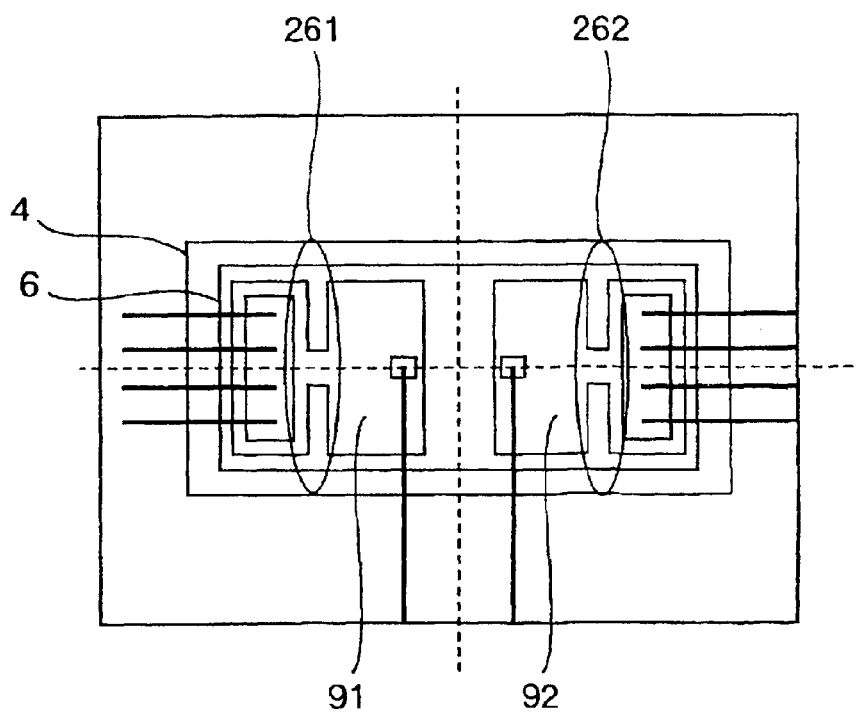
FIG. 7 is a configuration view showing a shunt resistor according to a sixth embodiment of the invention.

FIG. 7 shows an example of a shunt resistor according to a sixth embodiment of the invention. This embodiment is different from the embodiment described in FIG. 4 in the following point. That is, one constricted portion 23 is provided in each of the plates 9 in FIG. 4, and the distance of one of the constricted portions 23 from the widthwise center line of the shunt resistance 8 is different from that of the other constricted portion 23 therefrom.

Thus, unevenness of an electric current appearing in respective wires due to electromagnetic induction caused by mutual inductance among the wiring in the power module and the shunt resistor, or unevenness of an electric current appearing in the wiring and the shunt resistor in the layout where the connection wiring is bent sharply near the shunt resistor is rectified by use of the respective constricted portions provided in the respective plates 9. In this case, for example, a first constricted portion 261 prepared in a first plate 91 is disposed so that the distance between the first constricted portion 261 and the shunt resistance 8 is 1 cm. On the other hand, a second constricted portion 262 prepared in a second plate 92 prepared on the opposite side of the shunt resistance 8 is disposed so that the distance between the second constricted portion 262 and the shunt resistance 8 is 0.5 cm. In such a manner, the current density of the shunt resistance 8 is made uniform. Thus, a current flowing lopsidedly is rectified to be uniform so that a load current with current density made uniform can be made to flow into the shunt resistance 8. Accordingly, lopsided heat generation can be prevented in the shunt resistance 8 so that temperature unevenness can be reduced without changing the size of the shunt resistor 13, and hence local temperature increase can be reduced. Thus, the maximum allowable load current value can be increased so that the power converter can be miniaturized by the compact shunt resistor 13. Further, the error of a shunt resistance value can be reduced so that the voltage of the shunt resistance 8 can be detected with high accuracy. Thus, a high performance power converter can be provided.

Similar effect can be obtained when constrictions similar to the constricted portions 23 provided in the plates 9 are provided in the main electrodes 7.

Figure 8:
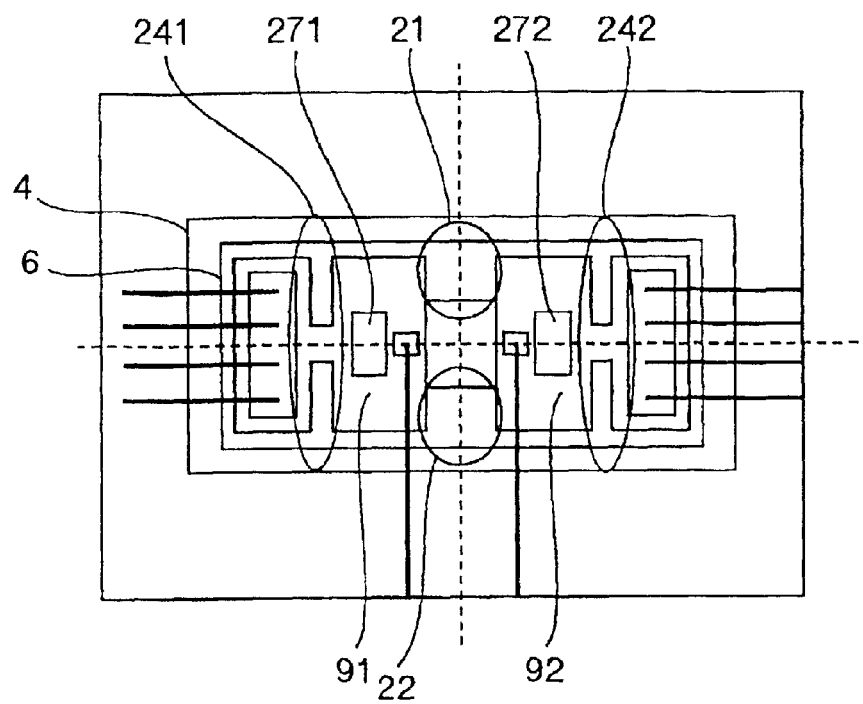
FIG. 8 is a configuration view showing a shunt resistor according to a seventh embodiment of the invention.

FIG. 8 shows an example of a shunt resistor according to a seventh embodiment of the invention. This embodiment is different from the embodiments described in FIGS. 1 and 4 in the following point. That is, at least one plate branch port 27 for branching a load current is provided in each of the plates 9 in FIGS. 1 and 4.

Thus, unevenness of an electric current appearing in respective wires due to electromagnetic induction caused by mutual inductance among the wiring in the power module and the shunt resistor, or unevenness of an electric current appearing in the wiring and the shunt resistor in the layout where the connection wiring is bent sharply near the shunt resistor is rectified by use of the plate branch ports 27 and the constricted portions provided in the respective plates 9. In this case, for example, the first constricted portion 241 prepared in the first plate 91 and at least one plate branch port 27 between the first constricted portion 241 and the shunt resistance 8 are disposed in positions at an equal distance from the first and second shunt resistances 21 and 22. Similarly, the plate branch port 27 is prepared in the second plate 92 prepared on the opposite side of the shunt resistance 8. In such a manner, the current density of the shunt resistance 8 constituted by the first and second shunt resistances 21 and 22 connected in parallel is made uniform. Thus, a current flowing lopsidedly into the first shunt resistance 21 or the second shunt resistance 22 is rectified to be uniform while the unevenness of the current density in the first and second shunt resistances 21 and 22 can be improved. Accordingly, lopsided heat generation can be prevented in the first or second shunt resistance 21 or 22 so that temperature unevenness can be reduced without changing the size of the shunt resistor 13, and hence local temperature increase can be reduced. Thus, the maximum allowable load current value can be increased so that the power converter can be miniaturized by the compact shunt resistor 13. Further, the error of a shunt resistance value can be reduced so that the voltage of the shunt resistance 8 can be detected with high accuracy. Thus, a high performance power converter can be provided.

Similar effect can be obtained when constrictions similar to the constricted portions 23 provided in the plates 9 are provided in the main electrodes 7.

Figure 9:
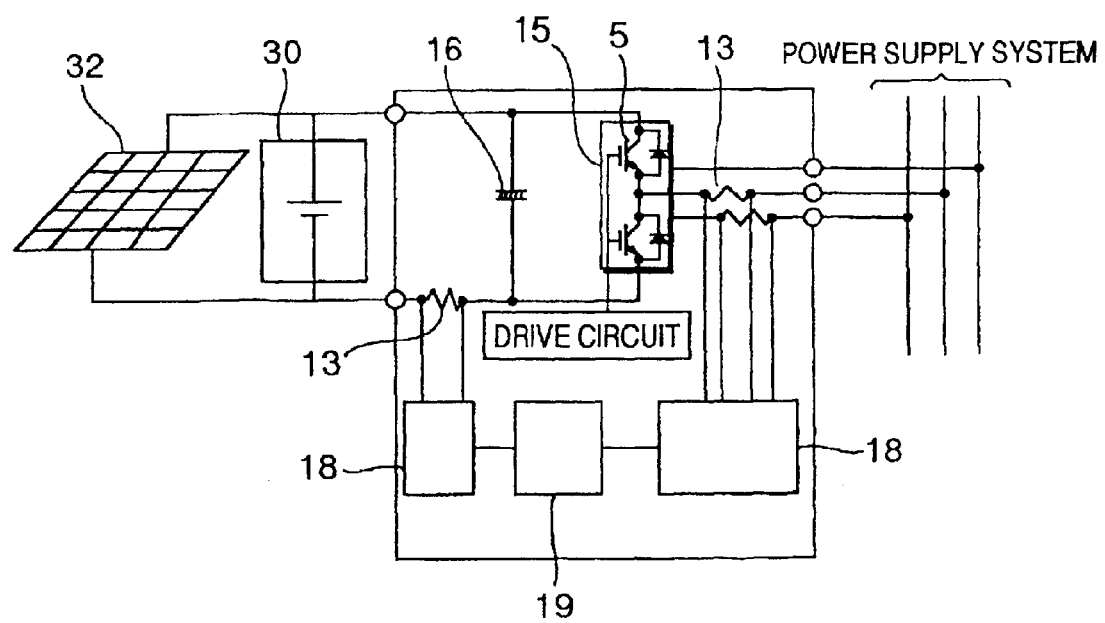
FIG. 9 is a configuration view showing a shunt resistor according to an eighth embodiment of the invention.
Figure 10:
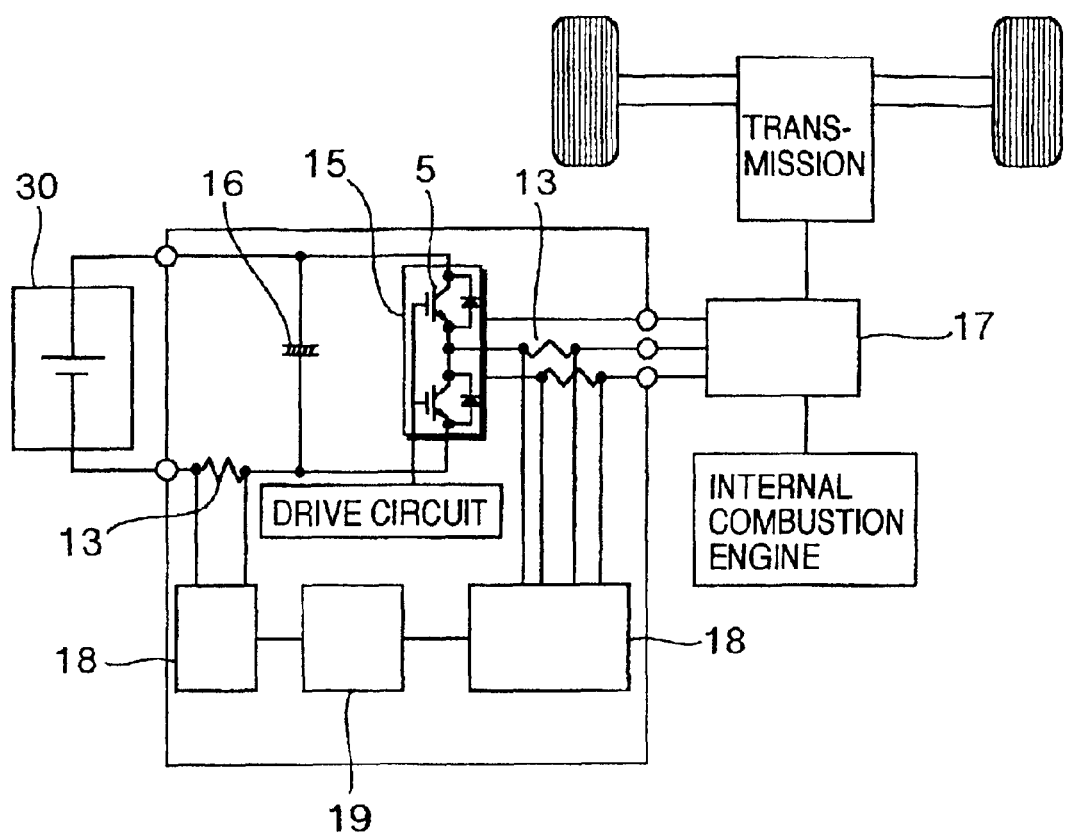
FIG. 10 is a configuration view showing a shunt resistor according to a ninth embodiment of the invention.

The power converters according to the embodiments described previously can be applied also to a power converter for linkage with a power supply system in a photovoltaic generation system constituted by a solar battery 32 and the power converter as shown in FIG. 9; an inverter for a carriage which moves in such a manner that an internal combustion engine and a motor 17 shown in FIG. 10 or only the motor 17 is used as a power source, and the power of the internal combustion engine and the motor is transmitted to tires through a transmission by use of a power system in which electric power supplied from a power storage 30 such as a battery is detected by a shunt resistor 13 so as to control the motor 17; any inverter for air conditioners, hydraulic pumps, brake driving motors 17, etc. mounted on such carriages; any inverter for driving compressors or motors for fans used in domestic and business-use air conditioners, motors for rotating washing tubs of washing machines, motors for suction fans of cleaners, or power converters for driving inductance for generating a magnetic field in electric cooking apparatus; and so on.

According to the present invention, plates 9 with low resistance are provided on main electrodes of the shunt resistor 13 so that heat generation is reduced. In addition, constricted portions 23 are provided in the plates 9 so that the current density distribution in a resistance portion is made uniform. Thus, a high-accuracy and high-reliability power converter can be provided at low cost.

It should be further understood by those skilled in the art that the foregoing description has been made on embodiments of the invention and that various changes and modifications may be made in the invention without departing from the spirit of the invention and scope of the appended claims.

What is claimed is:

1. A vehicle comprising:
   a power storing device for storing electric power supplied from a power generator driven by an internal combustion engine; and
   an inverter device connected to a load using the internal combustion engine or a motor acting as a power source, said inverter device including a shunt resistor including a plate-shaped resistive member having a shunt resistance portion and a plurality of electrode portions, a first side of the plate-shaped resistive member being secured to an insulator, the shunt resistor being operable to detect a load current flowing in the load, a detected value of the load current being used for controlling an output of the inverter device, said shunt resistor being operable to detect power supplied from said power storing device to control the motor.

2. A vehicle according to claim 1 where said motor includes a speed changing device for transmitting driving force of the internal combustion engine to tires of the vehicle so as to move the vehicle.

3. A vehicle according to claim 1 where said shunt resistor further including a plate secured to a second side surface of the insulator opposite to the first side, said plate having a volume electricity resistance rate smaller than that of the plate shaped resistive member and having a thermal conduction rate larger than that of the plate shaped resistive material, said plate including at least one plate electrode electrically connected to a circuit wiring of said inverter device and including adjacent to the shunt resistance portion a detection electrode for detecting a voltage generated across the shunt resistance portion.

4. A vehicle comprising an inverter device connected to a power storing device for storing electric power and a load using a motor as a power source, the inverter device including a shunt resistor having a plate-shaped resistive member including a shunt resistance portion and a plurality of electrode portions, a first side of the plate-shaped resistive member being secured to an insulator, said shunt resistor being operable to detect a load current flowing in the load, a detected value of the load current being used to control an output of said inverter so as to control the motor.

5. A vehicle according to claim 4 where said shunt resistor further includes a plate having a volume electricity resistance rate smaller than that of the plate-shaped resistive member and having a thermal conduction rate larger than that of the plate-shaped resistive member, said plate being secured to a second side surface of the insulator opposite to the first side, said plate including at least one plate electrode electrically connected to a circuit wiring of the inverter device, and including adjacent to the shunt resistive portion a detection electrode for detecting a voltage across the shunt resistance portion.

6. An electro-mechanical system provided on a vehicle including an internal combustion engine operating as a driving source of the vehicle and a battery operating as a power source of the vehicle, comprising:

a motor forming a driving source of the vehicle together with the internal combustion engine; and an inverter device electrically connected between the motor and the battery;

wherein the inverter device includes a current detector having a shunt resistor, wherein the shunt resistor includes a plate-shaped resistive material having a shunt resistance portion and a plurality of electrode portions, the shunt resistor further including an insulator provided on one surface of the shunt resistance portion and the plurality of electrode portions, and including a plate provided on a surface opposite to the surface of the plurality of electrode portions on which the insulator is provided and having a volume electricity resistance rate smaller than that of the plate-shaped resistive material, the current detector detecting a load current flowing from the inverter device to the motor, the inverter device receiving power from the battery and controlling power supplied from the battery on the basis of the load current detected by the current detector and supplying the controlled power to the motor, and the motor receiving the power controlled by the inverter device and generating a driving force for driving the vehicle.

7. An electro-mechanical system according to claim 6 wherein the plate is provided with at least one electrode electrically connecting a circuit wiring of the inverter device, the plate being further provided adjacent to the shunt resistance portion with an electrode for detecting a voltage generated in the shunt resistance portion.

8. An electro-mechanical system provided on a vehicle including a battery operating as a power source of the vehicle, comprising:

a motor for driving equipment provided on the vehicle;

an inverter device electrically connected between the motor and the battery;

wherein the inverter device includes a current detector having a shunt resistor, wherein the shunt resistor includes a plate-shaped resistive material having a shunt resistance portion and plurality of electrode portions, the shunt resistor further including an insulator provided on one surface of the shunt resistance portion and the plurality of electrode portions, and including a plate provided on a surface opposite to the surface of the plurality of electrode portions on which the insulator is provided and having a volume electricity resistance rate smaller that that of the plate-shaped resistive material, the current detector detecting a load current flowing from the inverter device to the motor, the inverter device receiving power from the battery and controlling power supplied from the battery on the basis of the load current detected by the current detector and supplying the controlled power to the motor, and the motor receiving the power controlled by the inverter device and generating a driving force for driving the vehicle.

9. An electro-mechanical system according to claim 8 wherein the plate is provided with at least one electrode electrically connecting a circuit wiring of the inverter means, the plate being further provided adjacent to the shunt resistance portion with an electrode for detecting a voltage generated in the shunt resistance portion.

* * * * *

UNITED STATES PATENT AND TRADEMARK OFFICE
CERTIFICATE OF CORRECTION

PATENT NO.    : 6,794,854 B2
DATED         : September 21, 2004
INVENTOR(S)   : Nakatsu et al.

It is certified that error appears in the above-identified patent and that said Letters Patent is hereby corrected as shown below:

Title page,
Insert Item -- [30] Foreign Application Priority Data JP 2001-250971 August 22, 2001 --.

Signed and Sealed this

Thirty-first Day of May, 2005

JON W. DUDAS
*Director of the United States Patent and Trademark Office*